United States Patent [19]

Kitayama et al.

[11] Patent Number: 4,898,139
[45] Date of Patent: Feb. 6, 1990

[54] ENGINE CONTROL APPARATUS

[75] Inventors: Tooru Kitayama; Toshiya Ohtani, both of Kanagawa, Japan

[73] Assignee: Nissan Motor Company, Limited, Yokohama, Japan

[21] Appl. No.: 241,876

[22] Filed: Sep. 8, 1988

[30] Foreign Application Priority Data

Sep. 9, 1987 [JP] Japan .................................. 62-227227

[51] Int. Cl.⁴ ........................... F02D 41/04; F02P 5/14
[52] U.S. Cl. ...................................... 123/425; 123/435
[58] Field of Search ................. 123/416, 417, 425, 435

[56] References Cited

U.S. PATENT DOCUMENTS

| | | | |
|---|---|---|---|
| 4,594,982 | 6/1986 | Takahashi et al. | 123/425 |
| 4,630,584 | 12/1986 | Higashiyama et al. | 123/425 |
| 4,708,113 | 11/1987 | Harada et al. | 123/425 |
| 4,715,342 | 12/1987 | Nagai | 123/425 |
| 4,790,281 | 12/1988 | Mieno et al. | 123/425 |
| 4,821,697 | 4/1989 | McDougal | 123/425 |

FOREIGN PATENT DOCUMENTS

| | | | |
|---|---|---|---|
| 0162035 | 8/1985 | Japan | 123/425 |
| 0190670 | 9/1985 | Japan | 123/425 |
| 60-212673 | 10/1985 | Japan | |
| 0107274 | 5/1987 | Japan | 123/425 |

Primary Examiner—Willis R. Wolfe
Attorney, Agent, or Firm—Foley & Lardner, Schwartz, Jeffery, Schwaab, Mack, Blumenthal & Evans

[57] ABSTRACT

An apparatus for controlling a spark ignited internal combustion engine comprising a control unit including a memory having first and second tables containing the desired relationships between the engine condition and the spark timing for the engine operating on low and high octane fuels. The control unit calculates a value corresponding to a setting of the spark timing repetitively at uniform intervals from the first table in response to a first level of the control signal and from the second table in response to a second level of the control signal and advances the spark timing at a predetermined rate in the presence of the first level of the control signal and changes to the second level when the spark timing is advanced over a first reference value. The control unit retards the spark timing at a second predetermined rate in response to engine knock in the presence of the second level of the control signal and changes the control signal to the first level when the spark timing is retarded over a second reference value. The control unit stores a maximum advance value $\beta_{max}$ to which the spark timing is advanced before the spark timing is advanced at the first predetermined rate during the successive advance control. The control unit clears the maximum advance value $\beta_{max}$ to zero when the spark timing is advanced over the first reference value during the advance control.

4 Claims, 5 Drawing Sheets

ENGINE CONTROL APPARATUS

BACKGROUND OF THE INVENTION

This invention relates to an apparatus for controlling an internal combustion engine of the spark ignition type including a spark-timing control means for controlling the timing of sparks supplied to the engine and, more particularly, to an engine control apparatus selectively using one of two tables to calculate a value corresponding to a setting of the spark-timing control means, the first table describing a desired relationship between the engine condition and the spark-timing control means for the engine being operating on low octane fuel, the second table describing a desired relationship between the engine condition and the spark timing control means for the engine being operating on high octane fuel.

In the field of internal combustion engines, detonation or knock is an undesirable event. In the past, it has been avoided by limiting the compression ratio or by providing gasoline with sufficient octane. Normally, the available lower octane fuel, which is referred to as regular leaded gasoline, has an octane number of about 83 and the available higher octane fuel, which is referred to as high-octane leaded gasoline, has an octane number of about 93. It is the current practice to increase the engine thermal efficiency by advancing the timing of sparks supplied to the engine as greater as possible to operate the engine in a condition close to a knock condition. For this purpose, high-octane leaded gasoline is useful to provide a higher anti-knock property.

If regular leaded gasoline is used for an engine designed to operate on high-octane fuel, however, the engine cannot provide sufficient engine output nor operate in a smooth manner since knocking occurs frequently. In order to avoid the problem, attempts have been made to control the spark timing with the use of selected one of two tables, the first table describing a desired relationship between the engine condition and the spark timing for the engine being operating on low octane fuel, the second table describing a desired relationship between the engine condition and the spark timing for the engine being operating on high octane fuel. For example, Kokai Jananese Pat. No. 60-212673 discloses such an engine control apparatus. The engine control apparatus includes a spark timing control unit and calculates a value corresponding to a setting of the spark timing control unit from the first table after the engine starts. When the engine condition is within a specified range of values of engine speed and engine load, the engine control apparatus performs advance control to advance the spark timing at a predetermined rate. The used table is changed from the first table to the second table when the spark timing is advanced over a first reference value during the advance control. The engine control apparatus performs knock control to retard the spark timing at a predetermined rate when knocking occurs during the course of the spark timing control with the use of the second table. The used table is changed from the second table to the first table when the spark timing is retarded over a second reference value during the knock control.

Since the conventional engine control apparatus cancels the value by which the spark timing is advanced relative to the calculated value during the advance control when the engine condition is out of the specified range and advances the spark timing at the predetermined rate from a calculated value during the successive advance control, however, it cannot make a smooth change from the first table to the second table even though the engine is operating on high octane fuel when the engine condition remains in a short time within the specified range. For this reason, the conventional engine control apparatus fails to derive the advantageous properties of the high octane fuel to a sufficient extent.

SUMMARY OF THE INVENTION

Therefore, it is a main object of the invention to provide an improved engine control apparatus which can change the used table from the first table to the second table in a smooth manner even when the engine condition remains in a short time within the specified range.

There is provided, in accordance with the invention, an apparatus for controlling an internal combusiton engine of the spark ignition type including spark-timing control means for controlling the timing of sparks supplied to the engine. The apparatus comprises sensor means for sensing a condition of the engine, a knock sensor for sensing engine knock, and a control unit including memory means having a first table describing a desired relationship between the sensed engine condition and the spark-timing control means for the engine being operating on first fuel having a first octane number and a second table describing a desired relationship between the sensed engine condition and the spark-timing control means for the engine being operating on second fuel having a second octane number greater than the first octane number. The control unit includes means for providing a control signal having a first and second level, and means for calculating a first value corresponding to a setting of the spark-timing control means repetitively at uniform intervals from the first table in response to the first level of the control signal and from the second table in response to the second level of the control signal. The apparatus also includes an electrical circuit coupled between the control unit and the spark-timing control means for converting the calculated first value into a setting of the spark-timing control means. The control unit includes means for performing advance control to advance the spark timing at a first predetermined rate when the sensed engine condition is within a specified range in the presence of the first level of the control signal, and means for changing the control signal from the first level to the second level when the spark timing is advanced over a first reference value during the advance control. The control unit includes means for performing knock control to retard the spark timing at a second predetermined rate in response to the sensed engine knock in the presence of the second level of the control signal, means for changing the control signal from the second level to the first level when the spark timing is retarded over a second reference value less than the first reference value during the knock control. The control unit includes means for storing a maximum value $\beta$max to which the spark timing is advanced at maximum during the advance control, means for advancing the spark timing by the stored maximum value $\beta$max before the spark timing is advanced at the first predetermined rate during the following advance control, and means for clearing the maximum value $\beta$max to zero when the spark timing is advanced over the first reference value during the advance control.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
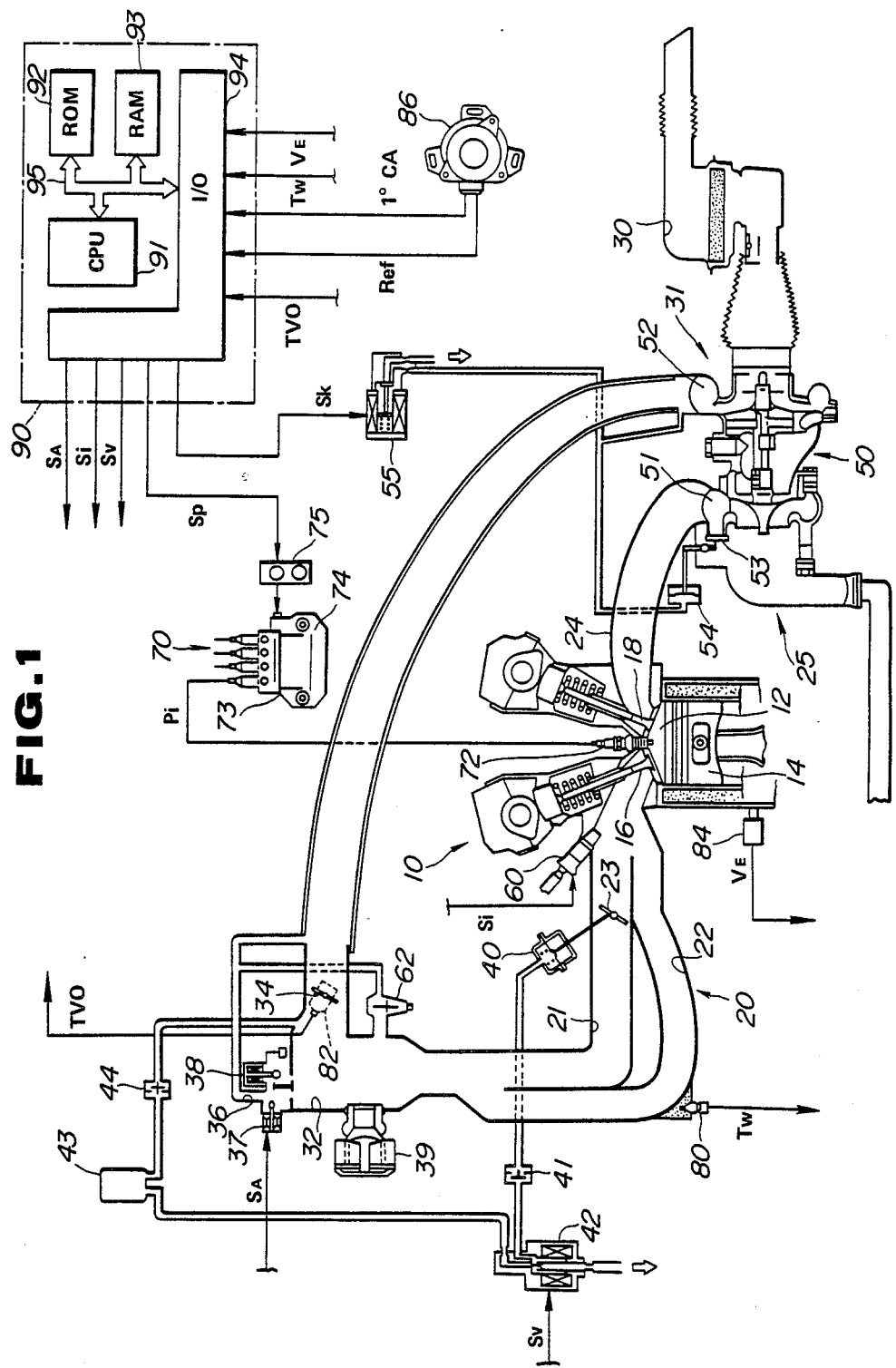
FIG. 1 is a schematic block diagram of an engine control apparatus made in accordance with the invention.

With reference to the drawings, and in particular to FIG. 1, there is shown a schematic diagram of a combustion control system embodying the apparatus of the invention. An internal combustion engine, generally designated by the numeral 10, for an automotive vehicle includes a combustion chamber or cylinder 12. A piston 14 is mounted for reciprocal motion within the cylinder 12. A crankshaft (not shown) is supported for rotation within the engine 10 in response to reciprocation of the piston 14 within the cylinder 12.

An intake manifold 20 is connected with the cylinder 12 through an intake port with which an intake valve 16 is in cooperation for regulating the entry of combustion ingredients into the cylinder 12 from the intake manifold 20. An exhaust manifold 24 is connected with the cylinder 12 through an exhaust port with which an exhaust valve 18 is in cooperation for regulating the exit of combustion products, exhaust gases, from the cylinder 12 into the exhaust manifold 24. The intake and exhaust valves 16 and 18 are driven through a suitable linkage with the crankshaft. The exhaust manifold 24 is connected through an exhaust passage 25 to the atmosphere.

Air to the engine is supplied through an air cleaner 30 into an intake passage 31 and hence through an throttle chamber 32 into the intake manifold 20. The amount of air permitted to enter the combustion chamber through the intake manifold 20 is controlled by a butterfly throttle valve 34 placed within the throttle chamber 32. The throttle valve 34 is connected by a mechanical linkage to an accelerator pedal (not shown). The degree to which the accelerator pedal is depressed controls the degree of rotation of the throttle valve 34. The accelerator pedal is manually controlled by the operator of the engine.

A bypass passage 36 is connected to bypass the throttle valve 34. An AAC valve 37 and an FICD valve 38 are provided for controlling the amount of air flow through the bypass passage 36 at idle conditions where the throttle valve 34 is at or near its closed position. The AAC valve 37 controls the air flow through the bypass passage 36 to the intake manifold 20 to maintain the engine at a desired idle speed in response to an idle speed control signal SA applied thereto from a control unit 90. The FICD valve 38 opens to cause a predetermined increase in the amount of air through the bypass passage 36 to the intake manifold 20 so as to cause a predetermined increase of the engine speed at an idle condition. A relief valve 39 is a safety valve which opens to connect the throttle chamber 32 to the atmosphere when the pressure in the throttle chamber 32 exceeds a predetermined level.

The intake manifold 20 has a main passage 21 and an auxiliary passage 22 bypassing the main passage 21. The auxiliary passage 22 has a smaller diameter and a longer length than the main passage 21. The main passage 21 has a power valve 23 placed therein. The power valve 23 is in its closed position when the engine is operating at a speed lower than a predetermined value and in its open position when the engine is operating at a speed greater than the predetermined value. The position of the power valve 23 is changed by a power valve switching unit including an actuator 40, a delay valve 41 and a solenoid valve 42. The solenoid valve 42 changes between two positions in response to a power valve switching signal SV applied thereto from the control unit 90. In the first position, the solenoid valve 42 introduces a negative pressure from a vacuum tank 43 through the delay valve 41 to the actuator 40. The vacuum tank 43 is connected through a check valve 44 to the throttle chamber 32 at a position downstream of the throttle valve 34. In the second position, the solenoid valve 42 connects the vacuum tank 43 to the atmosphere. When the power valve 23 is closed, the rate of air flow to the engine is increased due to the dimentions of the auxiliary passage 22 through which the whole amount of air to the engine is supplied. This is effective to increase the charging efficiency to such an extent sufficient to increase the engine torque. When the power valve 23 is open, air flows to the engine through both of the main and auxiliary passages 21 and 22 to reduce the resistance to air flow to the engine. This is effective to increase the engine output.

A turbosupercharger 50 has a compressor 51 placed in the exhaust passage 25 and a turbine 52 placed in the intake passage 31. The compressor 52 is connected to the turbine 51 so that a rotational force is transmitted from the turbine 51 to the compressor 52 so that the compressor 52 supercharges the air to the intake passage 31 when the turbine 51 is driven by the flow of the exhaust gases. The supercharged pressure of the turbosupercharger 50 is adjusted by the position of a swing valve 53. The swing valve 53 is connected through a mechanical linkage to a swing valve actuator 54 controlled by a solenoid valve 55. The solenoid valve 55 controls the level of the pressure suppled to the swing valve actuator 54 so as to adjust the position of the swing valve 53 in response to a supercharged pressure control signal SK fed thereto from the control unit 90.

A fuel injector 60 is connected to a fuel pump which is also connected to a fuel tank (not shown). The fuel pump is electrically operated to maintain sufficient pressure. The fuel injector 60 opens to inject fuel into the intake manifold 12 when it is energized by the presence of electrical current Si. The length of the electrical pulse, that is, the pulse-width, applied to the fuel injector 60 determines the length of time the fuel injector opens and, thus, determines the amount of fuel injected into the intake manifold 20. An ignition system, generally designated by the numeral 70, includes a spark plug 72 mounted in the top of the cylinder 12 for igniting the combustion ingredients within the cylinder 12 when the spark plug 70 is energized by the presence of high voltage electrical energy Pi from an ignition coil 73.

In the operation of the engine 10, fuel is injected through the fuel injector 60 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 72 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. The flow of the discharged exhast gases flow to the atmoshpere through the exhaust passage 25 drives the turbine 51 of the turbosupercharger 50. The rotational force is transmitted from the turbine 51 to the compressor 52 to compress the air to the throttle chamber 32.

Although the engine 10 as illustrated in FIG. 1 shows only one combustion chamber 12 formed by a cylinder and piston, it should be understood that the engine control system described herein is designated for use on a four-cylinder engine. Thus, it should be understood that there are at a total of four cylinders, intake valves, exhaust valves and reciprocating pistons, four spark plugs to ignite the air-fuel mixture within the combustion chambers.

The ignition system 70 includes a distributor 74 connected with the ignition coil 73 to energize the four spark plugs 72 of the engine. For this purpose, the ignition coil 73 has a primary winding connected across a battery through a transistor contained in a power unit 75. The ignition coil 73 has a high voltage terminal connected to a rotor of the distributor 74. The rotor is driven at one-half the rotational velocity of the crankshaft. The distributor 74 has four electrical contacts each of which is connected in the usual manner by separate electrical leads to the four spark plugs 72 of the engine. As the distributor rotor rotates, it sequentially contacts the electrical contacts to permit high voltage electrical energy Pi to be supplied at appropriate intervals to the spark plugs 72, causing sparks to be generated across the gaps of the respective spark plug 72. The distributor 74 does not control ignition-system spark-timing. Rather, spark-timing is an independently controlled variable calculated through the use of a digital computer in a manner hereinafter described.

It is to be understood that the illustrated four cylinder internal combustion engine 10 is shown and described only to facilitate a more complete understanding of the engine control system embodying the inventive apparatus.

The amount of fuel metered to the engine, this being determined by the width of the electrical pulses applied to the fuel injector 60, the fuel-injection timing, and the ignition-system spark timing are repetitively determined from calculations performed by a digital computer, these calculations being based upon various conditions of the engine that are sensed during its operation. These sensed conditions includes cylinder-head coolant temperature Tw, throttle position TVO, knock intensity VE, crankshaft position Ca, and crankshaft reference position Ref. Thus, a cylinder-head coolant temperature sensor 80, a throttle position sensor 82, a knock sensor 84 and a crankshaft position sensor 86 are connected to a control unit 90.

The cylinder-head coolant temperature sensor 80 preferably is mounted in the engine cooling system and comprises a thermistor connected in an electrical circuit capable of producing a DC voltage having a variable level proportional to coolant temperature. The throttle position sensor 82 is a potentiometer electrically connected in a voltage divider circuit for supplying a DC voltage proportional to the throttle valve position. The knock sensor 84 is mounted on the engine at a position for sensing engine vibrations to produce a signal VE indicative of a sensed engine vibrations. The crankshaft position sensor 86 produces a series of crankshaft position electrical pulses C1 each corresponding to one degree of rotation of the engine crankshaft and a series of reference electrical pulses Ca at a predetermined number of degrees before the top dead center position of each engine piston.

The control unit 90 may employ a digital computer which includes a central processing unit (CPU) 91, a read only memory (ROM) 92, a random access memory (RAM) 93, and an input/output control circuit (I/O) 94. The central processing unit 91 communicates with the rest of the computer via data bus 95. The input/output control circuit 147 includes an analog-to-digital converter, a crankshaft position counter, and a spark timing control circuit. The analog-to-digital converter receives analog signals from the various sensors 80 to 84 and it converts the received signals into corresponding digital signals for application to the central processing unit 91. The A to D coversion process is initiated on command from the central processing unit 91 which selects the input channel to be converted. The crankshaft position counter counts the crankshaft position pulses C1 and produces a digital signal indicative of engine speed N. The read only memory 92 contains the program for operating the central processing unit 91 and further contains appropriate data in look-up tables used in calculating appropriate values for ignition-system spark timing. The look-up data may be obtained experimentally or derived empirically. The look-up data include a first table for storing signals with values indicative of ignition-system spark-timing as a function of engine load and engine speed for the engine being operating on fuel having a small octane number and a second table for storing signals with values indicative of ignition-system spark-timing as a function of engine load and engine speed for the engine being operating on fuel having a great octane number. The central processing unit 91 may be programmed in a known manner to interpolate between the data at different entry points if desired. Control words specifying a desired spark timing are perioducally transferred by the central processing unit 91 to te spark timing control circuit which converts it into a control signal Sp to the power unit 75 for controlling the spark timing of the ignition system 70. The digital computer is responsive to an interrupt signal to temporarily stop execution of the program control sequence (background job) and to start executing an interrupt routine for controlling the parameters during a specified operating condition.

Figure 2:
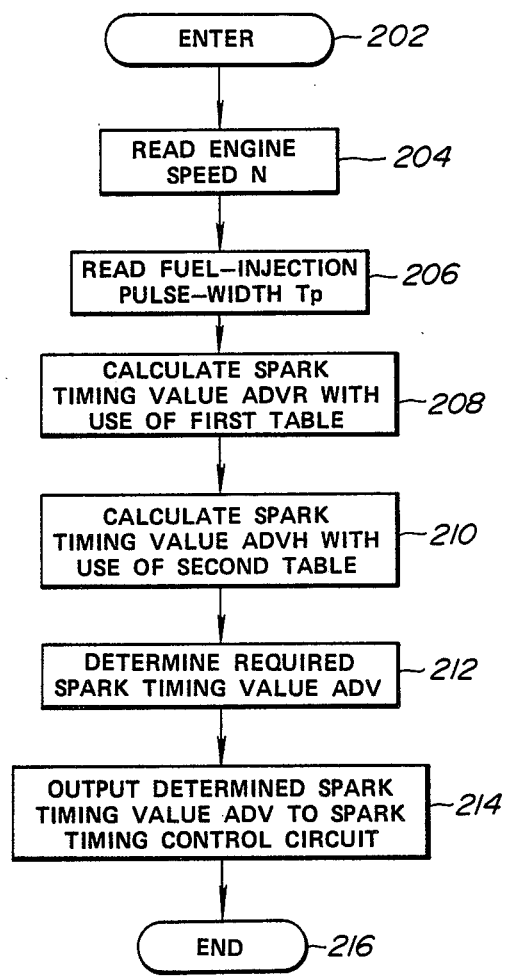
FIG. 2 is an overall flow diagram illustrative of the operation of the digital computer used to control the engine.

FIG. 2 is an overall flow diagram of the programming of the digital computer. The computer program is entered at the point 202 at uniform intervals of time or engine crankshaft rotation. At the point 204 in the program, the engine speed N is read into the random access memory 93. Similarly, at the point 206, the calculated value Tp for fuel-injection pulse-width is read into the random access memory 93. The fuel-injection pulse-width value Tp was calculated previously as a function of engine load and engine speed and read into the random access memory 93 for fuel-injection control.

At the point 208 in the program, the central processing unit 91 calculates a value ADVR for ignition-system spark-timing with the use of the first table that specifies this required value ADVR as a function of engine speed N and fuel-injection pulse-width Tp for the engine being operating on regular leaded gasoline. At the point 210 in the program, the central processing unit 91 calculates a value ADVR for ignition-system spark-timing with the use of the second table that specifies this required value ADVH as a function of engine speed N and fuel-injection pulse-width Tp for the engine being operating on high-octane leaded gasoline.

At the point 212 in the program, the central processing unit 91 determines a required value ADV for ignition-system spark-timing in such a manner as described later. At the point 214, the determined spark-timing value ADV is transferred to the spark-timing control circuit. The spark-timing control circuit sets the spark-timing by producing pulses Sp to the power unit 75 to cause an ignition spark to be produced at the time determined by the computer. Following this, the program proceeds to the end point 216.

Figure 3:
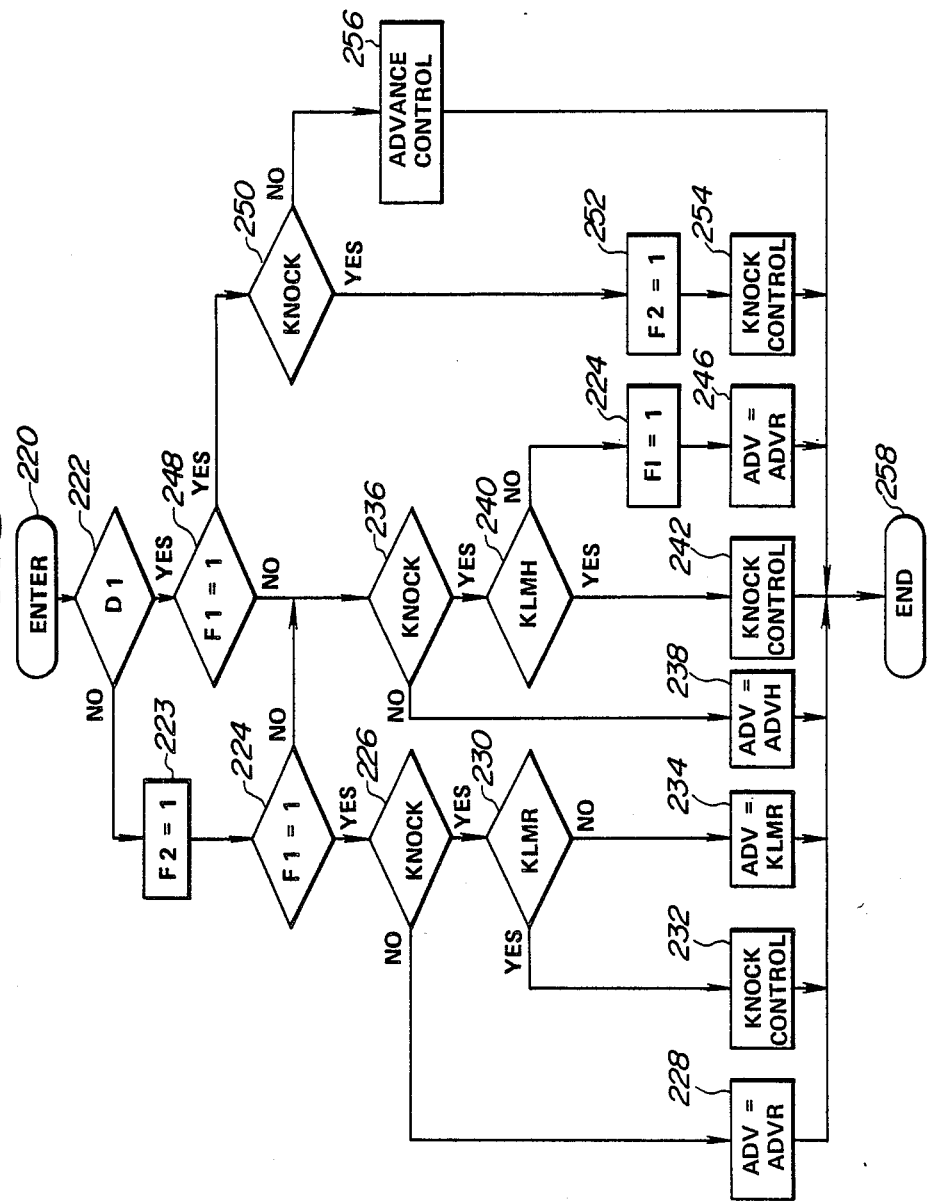
FIG. 3 is a detailed flow diagram illustrating the programming of the digital computer as it is used to calculate ignition-system spark timing.

FIG. 3 is a detailed flow diagram illustrating the above determination of a required value ADV for ignition-system spark-timing. At the point 220 of FIG. 3, which corresponds to the point 212 of FIG. 2, the computer program is entered. At the point 222 in the program, a determination D1 is made as to whether or not the engine is operating within a specified range of values of engine speed N and fuel-injection pulse-width Tp. The answer to this question is "yes" when the engine speed is in a range from 2,000 rpm to 4,000 rpm and the calculated fuel-injection pulse-width is in a range above 4 milliseconds. It is preferable that the read only memory 92 is pre-programmed in such a manner that the answer to this question inputted at the point 208 is "no" when the control unit 90 performs either of special control modes including, but not limited to,:

(1) a first control mode of retarding the ignition-system spark-timing relative to the calculated value in order to avoid the tendency to knock which may be caused upon opening of the power valve 23.

(2) a second control mode of advancing the ignition-system spark-timing relative to the calculated value in order to compensate for the tendency to retarded spark-timing which may be caused during engine starting. When the engine is starting, an overshot amount of fuel is injected to the engine, whereas the pressure under supercharged conditions is still below a value corresponding to the injected fuel amount.

(3) a third control mode of advancing the ignition-system spark-timing relative to the calculated value in order to improve the driving feeling when the engine idles after engine warming with its transmission being in a neutral position.

If the answer to this question is "no", then the program proceeds from the point 222 to the point 223 where a second flag F2 is set. Following this, the program proceeds to the point 224 where a determination is made as to whether or not an electrical signal (first flag F1) is set. This first flag F1 is set to indicate that the engine is operating on regular leaded gasoline having a smaller octane number than high-octane leaded gasoline. If the answer to this question is "yes", then the program proceeds to the point 226 where another determinaiton is made as to whether or not knocking occurs. This determinaiton is made by the central processing unit 91 based on the signal VE fed from the knock sensor 84. If the answer to this question is "no", then the program proceeds to the point 228 where the central processing unit 91 determines the value ADVR calculated at the point 208 of FIG. 2 as a required value ADV for ignition-system spark-timing. Upon completion of the step at the point 228, the program proceeds to the end point 258 which corresponds to the point 214 of FIG. 2.

If the answer to the question inputted at the point 226 is "yes", then it means that knocking occurs and the program proceeds to another determinaiton step at the point 230. This determination is as to whether or not the calculated value ADVR for ignition-system spark-timing is greater than a predetermined first limit value KLMR. If the answer to this question is "yes", then the program proceeds to the point 232 where knock control is performed. For this purpose, the central processing unit 91 calculates a required value ADV for ignition-system spark-timing in a manner to retard the ignition-system spark-timing at a rate of 1.2 degrees per second. Upon completion of the step at the point 232, the program proceeds to the end point 258.

If the answer to the question inputted at the point 230 is "no", then the program proceeds from the point 230 to the point 234 where the central processing unit 91 determines the first limit value KLMR as a required value ADV for ignition-system spark-timing. Upon completion of the step at the point 234, the program proceeds to the end point 258.

If the answer to the question inputted at the point 224 is "no", then it means that the engine is operating on high-octane leaded gasoline and the program proceeds to the point 236 where a determination is made as to whether or not knocking occurs. This determination is made by the central processing unit 91 based on the signal VE fed from the knock sensor 84. If the answer to this question is "no", then the program proceeds to the point 238 where the value ADVH calculated at the point 210 of FIG. 2 is determined as a required value ADV for ignition-system spark-timing. Upon completion of the step at the point 238, the program proceeds to the end point 258.

If the answer to the question inputted at the point 236 is "yes", then it means that knocking occurs and the program proceeds from the point 236 to the point 240 where another determination is made as to whether or not the ignition-system spark-timing value ADVH calculated at the point 210 of FIG. 2 is less than a predetermined second limit value KLMH greater than the first limit value KLMR. If the answer to this question is "yes", then the program proceeds to the point 242 where knock control is performed. For this purpose, the central processing unit 91 calculates a required value ADV for ignition-system spark-timing in a manner to retard the ignition-system spark-timing at a rate of 1.2 degrees per second. Upon completion of the step at the point 242, the program proceeds to the end point 258.

If the answer to the question inputted at the point 240 is "no", then the program proceeds from the point 240 to the point 244 where the first flag F1 is set. Following this, the program proceeds to the point 246 where the central processing unit 91 determines the value ADVR calculated at the point 208 of FIG. 2 as a required value ADV for ignition-system spark-timing. Upon completion of the step at the point 246, the program proceeds to the end point 258.

If the answer to the question inputted at the point 222 is "yes", then it means that the engine is operating within the specified range and the program proceeds to the point 248. At the point 248, a determination is made as to whether or not the first flag F1 is set. If the answer to this question is "no", then it means that the engine is operating on high-octane leaded gasoline and the program proceeds to the point 236. Otherwise, the program proceeds from the point 248 to the point 250.

At the point 250 in the program, a determination is made as to whether or not knocking occurs. This determination is made by the central processing unit 91 based on the signal VE fed from the knock sensor 84. If the answer to this question is "yes", then the program proceeds to the point 252 where the second flag F2 is set. Following this, the program proceeds to the point 254 where knock control is performed. For this purpose, the central processing unit 91 calculates a required value ADV for ignition-system spark-timing in a manner to retard the ignition-system spark-timing at a rate of 1.2 degrees per second. Upon completion of the step at the point 254, the program proceeds to the end point 258.

If the answer to the question is "no", then the program proceeds to the point 256 where advance control is performed in such a manner as described later. Upon completion of the step at the point 256, the program proceeds to the end point 258.

Figure 4:
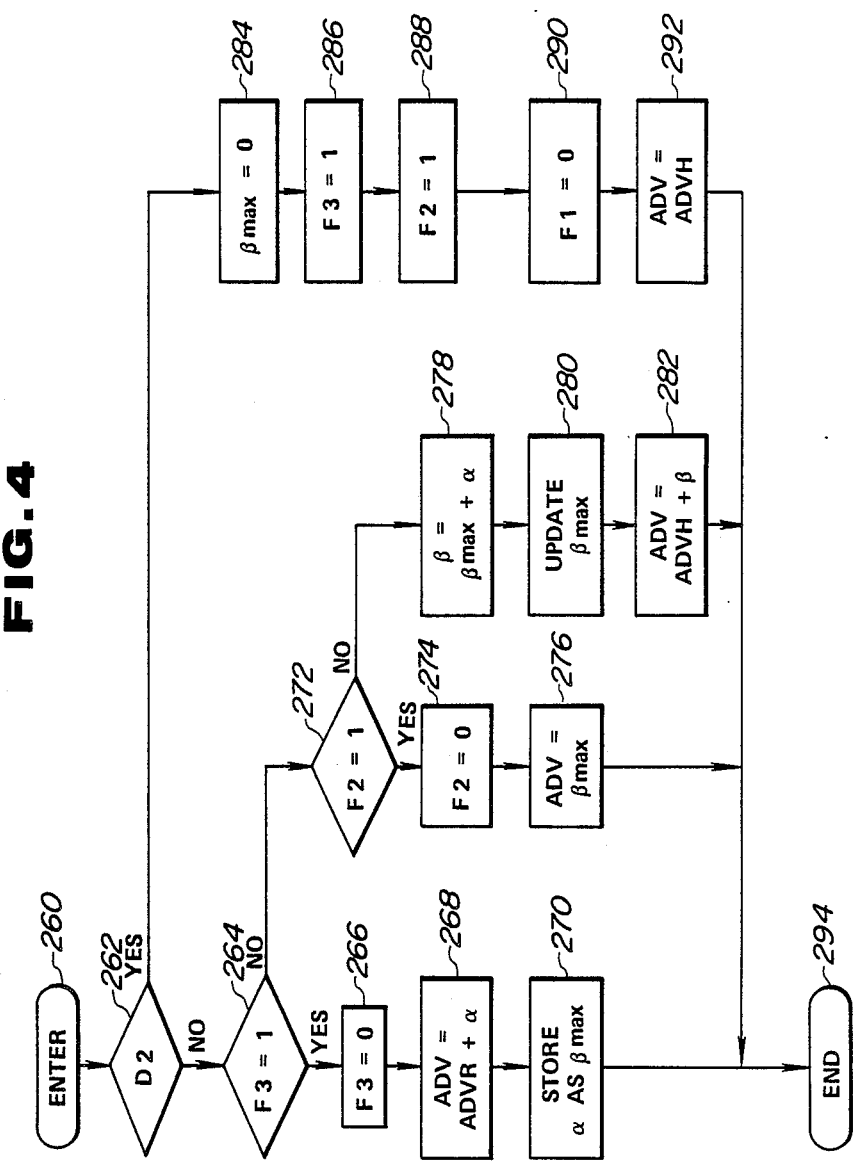
FIG. 4 is a detailed flow diagram illustrating the programming of the digital computer as it is used to perform advance control.

FIG. 4 is a detailed flow diagram illustrating the above advance control. At the point 260 of FIG. 4, which corresponds to the point 256 of FIG. 3, the computer program is entered. At the point 262 in the program, a determination D2 is made as to whether or not a change is required from the first table to the second table for calculating a required value ADV for ignition-system spark-timing. If the answer to this question is "no", then the program proceeds to the point 264 where another determination is made as to whether or not a third flag F3 is set. If the answer to this question is "yes", then the program proceeds to the point 266 where the third flag F3 is cleared. Following this, the program proceeds to the point 268 where the central processing unit 91 calculates a required value ADV for ignition-system spark-timing by adding a predetermined value ALPHA to the value ADVR calculated at the point 208 of FIG. 2. At the following point 270, the value $\beta$ (in this case equal to the value ALPHA), which is added to the calculated value ADVR, is stored as a maximum value $\beta$max into the random access memory 93. Upon completion of the step at the point 270, the program proceeds to the end point 294 which corresponds to the point 258 of FIG. 3.

If the answer to the question inputted at the point 264 is "no", then the program proceeds to another determination step at the point 272. This determination is as to whether or not the second flag F2 is set. If the answer to this question is "yes", then the program proceeds to the point 274 where the second flag F2 is cleared. Following this, the program proceeds to the point 276 where the central processing unit 91 reads the maximum value $\beta$max from the random access memory 93 and determines the maximum value $\beta$max as a required value ADV for ignition-system spark-timing. Upon completion of the step at the point 276, the program proceeds to the end point 294.

If the answer to the question inputted at the point 272 is "no", then the program proceeds to the point 278 where the central processing unit 91 reads the maximum value $\beta$max from the random access memory 93 and calculates a value $\beta$ by adding the value ALPHA to the read maximum value $\beta$max. At the point 280, the calculated value $\beta$max is used to update the old maximum value $\beta$max stored in the random access memory 93. Following this, the program proceeds to the point 282 where the central processing unit 91 calculates a required value for ignition-system spark-timing by adding the value $\beta$ calculated at the point 282 to the value ADVR calculated at the point 208 of FIG. 2. The value ALPHA is selected in such a manner that the ignition-system spark-timing is advanced at a rate of 1 degree per second. Upon completion of the step at the point 282, the program proceeds to the end point 294.

If the answer to the question inputted at the point 262 is "yes", then the program proceeds to the point 284 where the maximum value $\beta$max is cleared to zero. Following this, the third flag F3 is set at the point 286, the second flag F2 is set at the point 288, and the first flag F1 is cleared at the point 290. Following this, the program proceeds to the point 292 where the central processing unit 91 determines the value ADVH calculated at the point 210 of FIG. 2 as a required value ADV for ignition-system spark-timing. Upon completion of the step at the point 292, the program proceeds to te end point 294.

It is to be noted that the answer to the question inputted at the point 262 is "yes" only when the value $\beta$, which is the sum of the values ALPHA added to the value ADVR, exceeds an upper limit ADVH−LVL where ADVH is the ignition-system spark-timing value calculated at the point 210 of FIG. 2 and LVL is a predetermined value. It is preferable that the read only memlry 92 is pre-programmed in such a manner that the answer to the question inputted at the point 262 is "no" when the following condition is fulfiled:

$$ADVR + \beta max \leq ADVH - KLMH + 1$$

where ADVR indicates the ignition-system spark-timing value calculated at the point 208 of FIG. 2 and ADVH indicates the ignition-system spark-timing value calculated at the point 210 of FIG. 2. This is effective to avoid the case where the ignition-system spark-timing is retarded further when the ignition-system spark-timing value ADVH obtained from the second table exceeds the upper limit AVDH −LVL and it is retarded ralative to the limit KLMH.

It is to be noted that the calculated value ADV for ignition-system spark-timing may be modified in accordance with engine operating condition to provide good engine output performance.

As described above, the invention provides an apparatus for controlling an internal combustion engine of the spark ignition type including a spark-timing control device 75 for controlling the timing of sparks supplied to the engine. The engine control apparatus includes a control unit 90 including a read only memory 92. The read only memory 92 has a first table describing a desired relaionship between the engine condition and the spark-timing control device 75 for the engine being operating on low octane fuel and a second table describing a desired relationship between the engine condition and the spark-timing control device 75 for the engine being operating on high octane fuel. The control unit providing a control signal (first flag F1) having a first (F1=1) and second (F1=0) level. The control unit 90 calculates a first value corresponding to a setting of the spark-timing control device 75 repetitively at uniform intervals from the first table in response to the first level of the control signal and from the second table in response to the second level of the control signal. The control unit 90 performs advance control to advance the sprak timing at a predetermined rate when the engine condition is within a specified range in the presence of the first level of the control signal and changes the control signal (F1) from the first level (F1=1) to the second level (F1=0) when the spark timing is advanced over a first reference value (ADVH−LVL) during the advance control. The control unit 90 performs knock control to retard the spark timing at a second predetermined rate in response to engine knock in the presence of the second level of the control signal and changes the control signal (F1) from the second level (F1=0) to the first level (F1=1) when the spark timing is retarded over a second reference value (KLMH) less than the first reference value (ADVH−LVL) during the knock control. The control unit 90 stores a maximum value βmax to which the spark timing is advanced at maximum during the advance control. The control unit 90 advances the spark timing by the stored maximum value βmax before the spark timing is advanced at the first predetermined rate during the successive advance control. The control unit 90 clears the maximum value βmax to zero when the spark timing is advanced over the first reference value (ADVH−LVL) during the advance control.

Although the invention has been described in connection with ignition-system spark-timing control, it is to be understood that the engine control apparatus may be used with a supercharging control device 55 for controlling the degree of supercharging of the engine. In this case, the read only memory 92 is pre-programmed to have third and fourth tables, the third table describing a desired relationship between the sensed engine condition and the supercharging control device 55 for the engine being operating on low octane fuel. The second table describes a desired relationship between the sensed engine condition and the supercharging control device 55 for the engine being operating on the high octane fuel. The control unit calculates a second value corresponding to a setting of the supercharging control device 55 from the third table in response to the first level (F1=1) of the control signal (F1) and from the fourth table in response to the second level (F2=0) of the control signal (F1).

Similarly, the engine control apparatus may be used with a fuel control device 60 for controlling the amount of fuel supplied to the engine. In this case, the read only memory 92 is pre-programmed to have fifth and sixth tables, the fifth table describing a desired relationship between the engine condition and the fuel control device 60 for the engine being operating on low octane fuel. The sixth table describes a desired relationship between the engine condition and the fuel control device 60 for the engine being operating on high octane fuel. The control unit 90 calculates a third value corresponding to a setting of the fuel control device 60 from the fifth table in response to the first level (F1=1) of the control signal (F1) and from the sixth table in response to the second level (F1=0) of the control signal (F1).

Figure 5A:
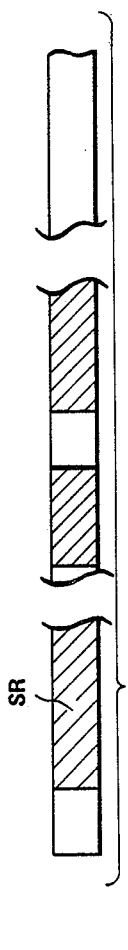
FIG. 5 contains three diagrams 5(a), 5(b) and 5(c) used in explaining the operation of the engine control apparatus of the invention.
Figure 5B:
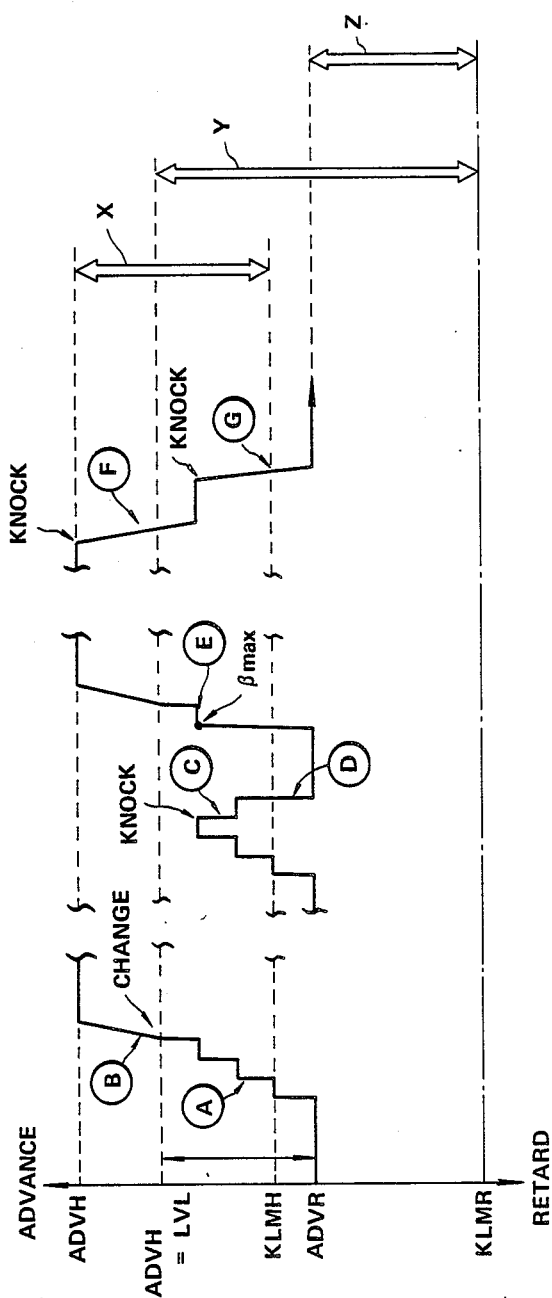
Figure 5C:
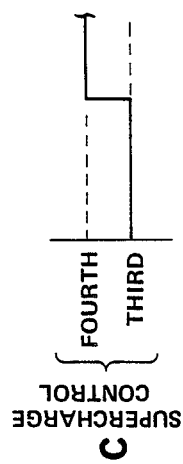

Referring to FIG. 5, the operation of the engine control apparatus will be described. It is now assumed that the central processing unit 91 uses the first table, which specifies a required value ADVR as a function of engine speed N and fuel-injection pulse-width Tp for the engine being operating on regular leaded gasoline, for controlling the ignition-system spark-timing and the third table for controlling the degree of supercharging. At a time when the engine operating condition enters the specified range SR of values of engine speed N and fuel-injection pulse-width Tp, as indicated by the hatched area of FIG. 5(a), the ignition-system spark-timing ADVR is advanced at a rate of 1 degree per second, as indicated by the character A of FIG. 5(b). When the ignition-system spark-timing is advanced over the limit ADVH−LVL, the first table is changed to the second table which specifies a required value ADVH as a function of engine speed N and fuel-injection pulse-width Tp for the engine being operating on high-octane leaded gasoline, as indicated by the character B of FIG. 5(b), while at the same time the third table is changed to the fourth table, as shown in FIG. 5(c). Thereafter, the central processing unit 91 calculates a required value ADVH for ignition-system spark-timing with the use of the second table.

When knocking occurs during the course of the spark-timing advancing control, the ignition-system spark-timing is retarded at a rate of 1.2 degrees per second, as indicated by the character C of FIG. 5(b). If knocking disappears during the course of the spark-timing retarding control, the ignition-system spark-timing is advanced again at the rate of 1 degree per second. If the engine operating condition changes out of the specified range SR before the first table is changed to the second table, the central processing unit 91 calculates a required value ADVR for ignition-system spark-timing with the use of the first table, as indicated by the character D of FIG. 5(b), and the maximum value βmax by which the ignition-system spark-timing can be advanced at maximum relative to the value ADVR calculated with the use of the first table is stored into the random access memory 93. If the engine operating condition enters the specified range SR again, the ignition-system spark-timing value ADVR calculated with the use of the first table is advanced by the maximum value βmax read from the random access memory 93, as indicated by the character E of FIG. 5(b). Thereafter, the ignition-system spark-timing ADVR +βmax is advanced at the rate of 1 degree per second. When the ignition-system spark-timing is advanced over the limit ADVH−LVL, the first table is changed to the second table. It is to be noted that the upper limit KLMH is set at a value advanced relative to the ignition-system spark-timing value ADVR calculated from the first table.

It is, therefore, apparent that the maximum value βmax by which the ignition-system spark-timing is advanced at maximum relative to the value ADVR calculated with the use of the first table is stored and is used to advance the ignition-system spark-timing relative to the value ADVR calculated with the use of the first table at a time when the engine operating condition enters the specified range SR again. This is effective to provide a smooth change from the first table to the second table even if the engine operating condition is maintained in a short time within the specified range SR. It was found through experiments that the engine control apparatus of the invention can provide a smooth change from the first table to the second table when the transmission is in either of "top gear", "third gear" and "over drive" althouth the conventional engine control apparatus can make a smooth change from the first table to the second table only when the transmission is in "over drive".

When knocking occurs during the course of the ignition-system spark-timing control with the use of the second table, the ignition-system spark-timing is retarded at a rate of 1.2 degrees per second, as indicated by the character F of FIG. 5(b). When the ignition-system spark-timing is retarded over the limit KLMH, the second table is changed to the first table, as indicated by the character G of FIG. 5(b), while at the same the fourth table is changed to the third table, as shown in FIG. 5(c). Thereafter, the central processing unit 91 calculates a required value ADVR for ignition-system spark-timing with the use of the first table. In FIG. 5(b), the character X indicates the range in which the ignition-system spark-timing is controlled with the use of the second table, the character Y indicates the range in which the ignition-system spark-timing is controlled with the use of the first table for the engine operating condition being within the specified condition SR, and the character Z indicates the range in which the ignition-system spark-timing is controlled with the use of the first table for the engine operating condition being out of the specified range SR.

What is claimed is:

1. An apparatus for controlling an internal combusiton engine of the spark ignition type including spark-timing control means for controlling the timing of sparks supplied to the engine, comprising:

sensor means for sensing a condition of the engine;

a knock sensor for sensing engine knock;

a control unit including memory means having a first table describing a desired relationship between the sensed engine condition and the spark-timing control means for the engine being operating on first fuel having a first octane number and a second table describing a desired relationship between the sensed engine condition and the spark-timing control means for the engine being operating on second fuel having a second octane number greater than the first octane number, the control unit including means for providing a control signal having a first and second level, and means for calculating a first value corresponding to a setting of the spark-timing control means repetitively at uniform intervals from the first table in response to the first level of the control signal and from the second table in response to the second level of the control signal;

an electrical circuit coupled between the control unit and the spark-timing control means for converting the calculated first value into a setting of the spark-timing control means,;

the control unit including means for performing advance control to advance the spark timing at a first predetermined rate when the sensed engine condition is within a specified range in the presence of the first level of the control signal, and means for changing the control signal from the first level to the second level when the spark timing is advanced over a first reference value during the advance control;

the control unit including means for performing knock control to retard the spark timing at a second predetermined rate in response to the sensed engine knock in the presence of the second level of the control signal, means for changing the control signal from the second level to the first level when the spark timing is retarded over a second reference value less than the first reference value during the knock control;

the control unit including means for storing a maximum value $\beta$max to which the spark timing is advanced at maximum during the advance control, means for advancing the spark timing by the stored maximum value $\beta$max before the spark timing is advanced at the first predetermined rate during the following advance control, and means for clearing the maximum value $\beta$max to zero when the spark timing is advanced over the first reference value during the advance control.

2. The apparatus as claimed in claim 1, wherein the engine includes supercharging control means for controlling the degree of supercharging of the engine, wherein the memory means having a third table describing a desired relationship between the sensed engine condition and the supercharging control means for the engine being operating on the first fuel and a second table describing a desired relationship between the sensed engine condition and the supercharging control means for the engine being operating on the second fuel, wherein the control unit includes means for calculating a second value corresponding to a setting of the supercharging control means from the third table in response to the first level of the control signal and from the fourth table in response to the second level of the control signal, and wherein the apparatus includes an electrical circuit coupled between the control unit and the supercharging control means for converting the calculated second value into a setting of the supercharging control means.

3. The apparatus as claimed in claim 2, wherein the engine includes fuel control means for controlling the amount of fuel supplied to the engine, wherein the memory means having a fifth table describing a desired relationship between the sensed engine condition and the fuel control means for the engine being operating on the first fuel and a sixth table describing a desired relationship between the sensed engine condition and the fuel control means for the engine being operating on the second fuel, wherein the control unit includes means for calculating a third value corresponding to a setting of the fuel control means from the fifth table in response to the first level of the control signal and from the sixth table in response to the second level of the control signal, and wherein the apparatus includes an electrical circuit coupled between the control unit and the fuel control means for converting the calculated third value into a setting of the fuel control means.

4. The apparatus as claimed in claim 1, wherein the engine includes fuel control means for controlling the amount of fuel supplied to the engine, wherein the memory means having a fifth table describing a desired relationship between the sensed engine condition and the fuel control means for the engine being operating on the first fuel and a sixth table describing a desired relationship between the sensed engine condition and the fuel control means for the engine being operating on the second fuel, wherein the control unit includes means for calculating a third value corresponding to a setting of the fuel control means from the fifth table in response to the first level of the control signal and from the sixth table in response to the second level of the control signal, and wherein the apparatus includes an electrical circuit coupled between the control unit and the fuel control means for converting the calculated third value into a setting of the fuel control means.

* * * * *